United States Patent [19]

Soules

[11] Patent Number: 5,019,427
[45] Date of Patent: May 28, 1991

[54] APPARATUS AND PROCESS FOR IMPROVED THERMOPLASTIC PREPREG MATERIALS

[75] Inventor: David A. Soules, Bartlesville, Okla.

[73] Assignee: Phillips Petroleum Company, Bartlesville, Okla.

[21] Appl. No.: 342,415

[22] Filed: Apr. 24, 1989

[51] Int. Cl.$^5$ .............................................. B05D 3/02
[52] U.S. Cl. ................................. 427/375; 118/420; 118/429
[58] Field of Search .................. 427/434.4, 434.5, 375; 118/423, 428, 429, 420

[56] References Cited

U.S. PATENT DOCUMENTS

| 3,081,535 | 3/1963 | Lincoln | 118/429 X |
| 3,091,217 | 5/1963 | Seymour | 118/420 |
| 3,595,207 | 7/1971 | Stricker | 118/420 |
| 3,923,002 | 12/1975 | Vanyi | 118/429 X |
| 4,325,750 | 4/1982 | Takaoka et al. | 427/434.4 X |
| 4,680,224 | 7/1987 | O'Connor | 428/294 |

Primary Examiner—Shrive Beck
Assistant Examiner—Alain Bashore
Attorney, Agent, or Firm—Richmond, Phillips, Hitchcock & Umphlett

[57] ABSTRACT

Apparatus and methods are disclosed for producing fiber reinforced thermoplastic materials having substantially reduced amounts of breakage of the fibers and substantially increased tensile strength. In the preferred embodiment, relatively large diameter rollers are used to guide the filaments through a slurry bath of powdered resin, and spray header means are provided in the slurry bath to forcefully contact the filaments with the resin in the slurry.

13 Claims, 3 Drawing Sheets

APPARATUS AND PROCESS FOR IMPROVED THERMOPLASTIC PREPREG MATERIALS

BACKGROUND OF THE INVENTION

1. Field of the Invention

The present invention relates to the field of producing fiber reinforced thermoplastic materials, and more particularly to methods and apparatus for increasing the transverse tensile strength of such materials while substantially reducing the amount of breakage of the fibers in such materials.

2. Prior Art

U.S. Pat. No. 4,680,224 assigned to the Phillips Petroleum Company, the complete disclosure of which is hereby incorporated by reference, broadly discloses a prior process for porducing fiber reinforced thermoplastic material in the form of tape by a process known as "pultrusion". While the apparatus and process disclosed in this patent has successfully produced commercial fiber reinforced thermoplastic impregnated tape, and laminates and other composites produced from such tapes, a problem has been encountered with the degree of breakage of the filaments or fibers as they pass through the bath in which the fibers are impregnated and coated with the thermoplastic resin. In addition, the transverse tensile strength of the impregnated fiber coated tape has not been as high as is currently desired for certain applications such as in the aerospace field where portions of aircraft are fomed from laminates or composites which are made from the fiber reinforced thermoplastic tape produced by this prior art process.

BRIEF SUMMARY OF THE INVENTION

The present invention provides methods and apparatus for producing fiber reinforced thermoplastic tape with a substantially decreased amount of breakage of the fiber or filaments, and wherein the transverse tensile strength is substantially improved. More particularly, the present invention utilizes large diameter redirect rollers, in place of small diameter stationary redirect bars, and further utilizes a spray means submerged in the slurry bath of resin to be impregnated on the filaments or fibers, which spray means produces a high velocity curtain of the slurry liquid of the bath in forceful contact with the filaments or fibers so that the latter are both impregnated and thoroughly coated with the thermoplastic resin.

DETAILED DESCRIPTION

Figure 1:
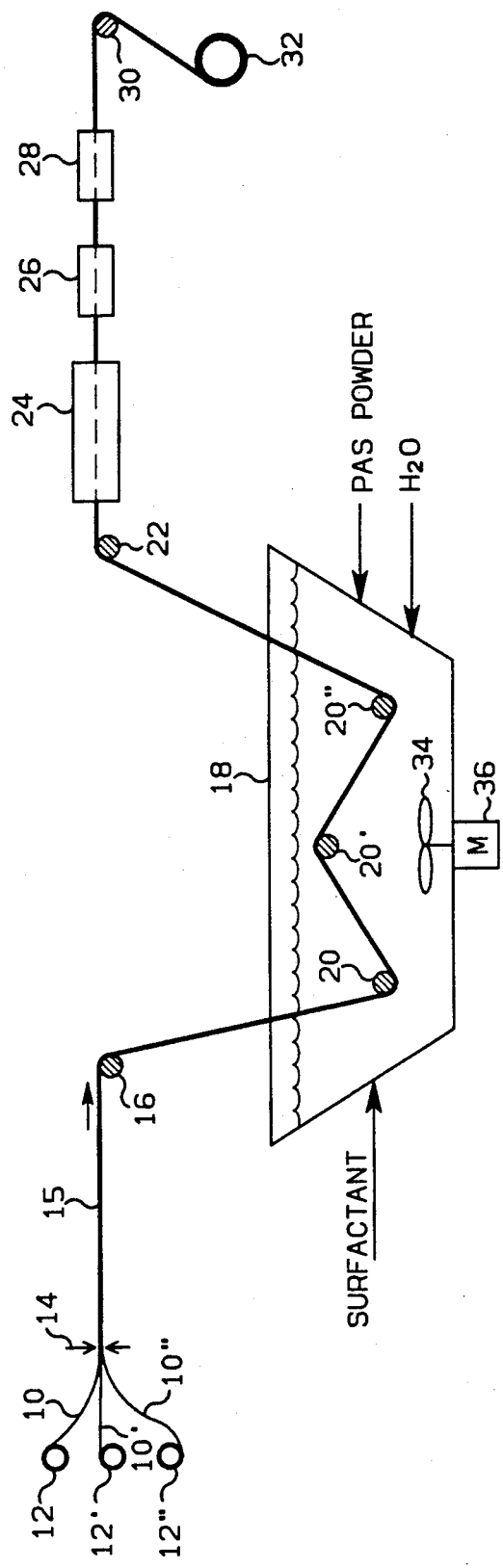
FIG. 1 is a schematic drawing illustrating the principal process elements of one prior art process for forming fiber reinforced thermoplastic tape.

Referring first to FIG. 1, the typical prior art process begins with bundles of filaments or fibers 10, 10' and 10" coming off of spools or rovings 12, 12' and 12", the latter of which represent three of what may be a substantial number of spools or rovings of glass, carbon or other known filament or fibers, hereinafter generically referred to as filaments. For example, glass bundles may contain anywhere from 400 to 4,000 glass filaments per bundle, and the bundles are usually passed through a guide 14 to laterally space them across the width of a redirect bar 16.

After passing over redirect bar 16, the continuous glass, carbon or other filaments 15 enter a bath 18 which contains the resin slurry which may include poly(arylene sulfide), referred to as PAS, or polyphenylene sulfide, referred to as PPS, or other thermoplastic resin in suspended powder form. For example, the bath may contain in the range of 4% to 30% by weight of powdered resin in a water solution which also includes in the range of 0.05% to 0.25% of a surfactant based on the total weight of the water and resin, the latter of which promotes the mixing of the dry powder with the water is as well known in the art.

While the filaments are passing through bath 18 in the prior art process, they are usually passed under and over a plurality of solid redirect bars 20, 20' and 20" which function to further separate the filaments laterally so as to promote the impregnation by the resin in the slurry bath 18. It is important to note that, in the prior art process, the solid redirect bars 20, 20' and 20" are stationary and do not rotate, and that their use has only been possible with carbon filaments, which may have 3,000 to 12,000 filaments per tow, or glass filaments which contain in the order of 400 filaments per bundle and the bundles do not have the sizing broken as will subsequently be described in greater detail. Similarly, redirect bar 22 above the bath 18 has been stationary and non-rotatable in the prior process.

It will also be noted that an impeller 34, driven by a motor 36, has been employed to maintain the powder, surfactant and water in a uniform slurry by preventing the powder from settling to the bottom of the bath.

After passing over redirect bar 22, the continuous fibers or filaments pass through a heated drying chamber 24 which vaporizes the water from the slurry bath 18. The fibers or filaments then pass from the drying heater 24 through a heated die 26 in which the resin is heated above its melting point and the multiple filaments become bonded together by the resin matrix so as to form what is called a "prepreg" tape. The continuous prepreg tape and the filaments 15 are pulled throughout the entire process by a conventional pultrusion apparatus 28. Pultrusion apparatus 28 may comprise a plurality of driving mandrels, or drive belts, which engage the upper and lower surfaces of the prepreg tape and pull the tape and the filaments through the process as is well-known in the prior art.

Lastly with regard to the prior art process, the prepreg tape usually passes around a redirect bar 30 and is either formed directly into a product, such as laminate or composite sheets, or the prepreg tape is wound on a mandrel 32 which is shipped to the location at which the prepreg tape is unwound from the mandrel and formed into composite sheets which may then be molded into a desired shape to form the final product.

While the prepreg tape produced by the prior art process as described hereinabove has been acceptable in the past, a very significant amount of breadkage of the glass filaments has occurred in passing over and under the stationary redirect bars 20, 20', 20" and 22, and furthermore, the lateral or transverse tensile strength of the glass filament prepreg tape has been in the order of 1.5 KSI, and that of carbon fiber prepreg tape has been in the order of 2-3 KSI, as measured by the standard ASTM test D-3039.

Figure 2:
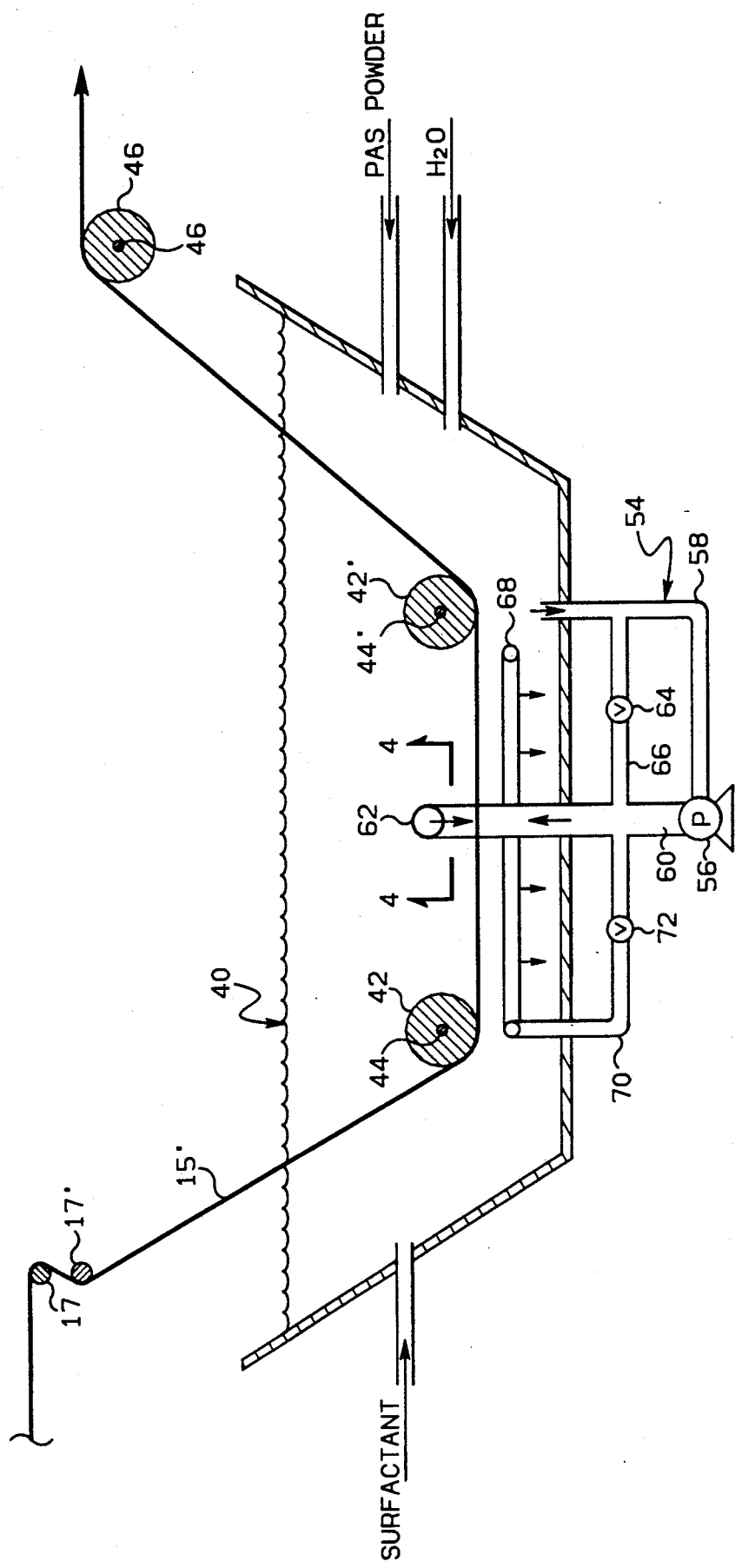
FIG. 2 is a schematic drawing illustrating several of the preferred elements comprising the apparatus and process of the present invention.

Referring now to FIG. 2, which illustrates the preferred embodiment and best mode of the invention, it will be noted that after the multiplicity of glass filament 15' have been pulled from the rovings similar to those illustrated as 12, 12' and 12" in FIG. 1, the glass filaments are passed through two or more breaker bars 17, 17' which function to crack and remove the sizing on the bundles. As a result of this in combination with other features of the present invention, bundles containing in the order of 4,000 filaments per bundle may be used. The multiplicity of glass filaments 15' enters bath 40 of the present invention which contains an equeous slurry of thermoplastic resin, such as powdered PAS or PPS, and surfactant as previously described. However, instead of passing over and under stationary redirect bars as in the past practice, the multiplicity of glass filaments is guided through the bath by a pair of large diameter redirect rollers 42, 42' which are suitably journaled for rotation on shafts 44, 44' as will be subsequently described in greater detail. Similarly, it will be noted that the stationary redirect bar 22 of the prior process has been replaced with a large diameter redirect roller 46 which is mounted for rotation about stationary shaft 48.

Figure 3:
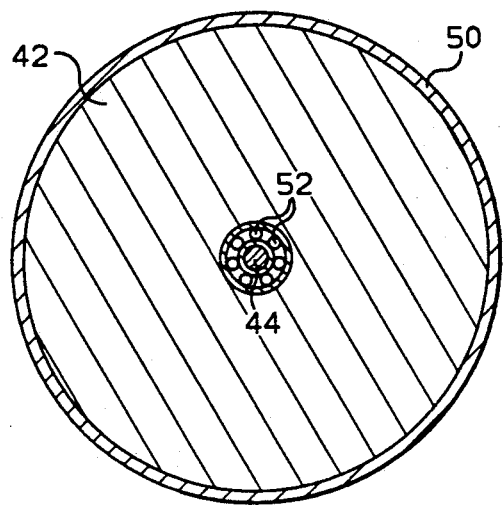
FIG. 3 is an enlarged, sectional view showing the more detailed construction of one of the redirecting rollers shown more schematically in FIG. 2.

Referring to FIG. 3, the details of redirect rollers 42, 42' and 46 will now be described. During extensive tests it has been determined that rollers having diameters of less than 2 inches are not preferred. That is, extensive tests have shown that the diameter of the redirect rollers should be greater than 2 inches, and preferably in the order of 3-6 inches or more in diameter. With respect to the material of the rollers, they may be of polished stainless steel, or preferably, they may be of other types of steel with a ceramic coating 50.

With respect to the bearings for mounting the rollers on stationary shafts 44, 44' and 48, it has been found that ballbearings 52 having plastic inner and outer races are preferred since they minimize problems of corrosion which may occur with the use of metallic bearing races. In addition, it has been unexpectedly discovered that the bearings should have inner and outer races which provide more than the normal clearance for the ballbearings 52 so that the resin powder in the bath does not jam the bearings. For example, radial tolerances in the order of 2-8 thousandths of an inch are preferred so that the particles of the resin may be washed in and out of the bearings rather than remaining in the bearings and causing them to become clogged.

Figure 4:
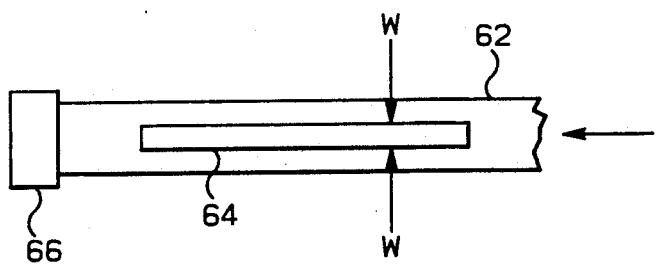
FIG. 4 is a fragmentary view of a portion of a spray header taken along the plane of viewline 4—4 of FIG. 2.

In addition to the use of redirect rollers 42, 42' and 46, the process has been substantially improved by the addition of a slurry spraying mechanism generically designated by numeral 54. Spraying mechanism 54 includes a pump 56 having an inlet pipe 58 connected to the slurry bath, and a discharge pipe 60 which is connected to one or more spray headers 62. As more clearly shown in FIG. 4, spray header 62 comprises a pipe having a cap 66 at one end and a slot 64 which extends at least the full width of the glass filaments 15' which are passed under the spray header 62. Thus, a curtain of high velocity slurry issues from slot 64 and forcefully impacts against, and flows between, the individual filaments as they proceed between the redirect rollers 42 and 42'. Thus, the individual filaments are forcefully contacted with the slurry so that the filaments become deeply impregnated, as well as being thoroughly coated with the resin.

As a result of the increased penetration, i.e. impregnation, of the resin into the individual fibers, and the more complete and uniform coating of the individual fibers, a substantially strengthened bonded matrix of resin is formed when the impregnated and coated filaments pass through the heated die such that the transverse tensile strength of the prepreg tape has been substantially improved. For example, the transverse tensile strength of the prepreg tape has been increased from the previously indicated values of 1.5 and 4 KSI for glass and carbon, respectively, to more than 4 and 7 KSI, respectively. Thus, the transverse tensile strength has been increased by a factor of more than 2 for glass fibers, and almost 2 for carbon fibers. This represents a very substantial improvement in the final prepreg tape and its ability to withstand the requirements of various applications such as those in the aerospace field which demand high transverse tensile strength.

Referring back to spray system 54 as shown in FIG. 2, the velocity of the spray may be controlled by valve 65 located in bypass line 67, and the thermoplastic powder is preferably kept in a well mixed slurry by a spray header 68 having downwardly directed ports which produce jets of slurry and continuous circulation in the bath. Spray header 68 is preferably connected through a line 70, having a control valve 72, which is connected to the pump discharge line 60, whereby the velocity of the jets and amount of circulation in the bath may be controlled.

With respect to the number and arrangement of spray headers which should be employed, it has been unexpectedly discovered that the degree of penetration of the resin into the individual filaments, and the degree of coating between the filaments is actually higher when one or more spray headers 62 are located only above or below the filaments in the bath, whereas, one would expect that the maximum impregnation and coating would occur when the filaments 15' were contacted by both upper and lower curtains of slurry impacting both the upper and lower surfaces of the filaments passing there between. It is theorized that this unexpected result occurs because two opposing curtains of slurry may tend to disrupt and lessen the force of the impact of the powder against the filaments, whereas one or more curtains of slurry impacting on only one side of the filaments produces greater force of impacting and more uniform coating of the fibers. Regardless of the correctness of this theory, the preferred embodiment of the invention is to impact the filaments from only one side, i.e., either the upper or lower surface, but not both.

It has also been discovered that the width W of slot 64 should be in the order of one-quarter to one-sixteenth inch, and preferably in the order of one-eighth of an inch in order to obtain optimum impregnation with a minimum of plugging of the slot by the powdered resin in the slurry bath.

From the foregoing description it will be apparent that the apparatus and process of the present invention achieves substantial improvements. For example, it produces a substantial decrease in the amount of damaged fiber, which decrease is in the order of 100% when using the type of glass filaments having in the order of 4,000 filaments per bundle and a single bundle per roving. Also, the transverse tensile strength of the resultant prepreg tape may be substantially increased from that achieved in the prior art processes; i.e., by a factor in the order of two.

While the foregoing description has referred to carbon and glass as being the preferred type of fibers or filaments, the apparatus and process of the present invention is also applicable to aramid, ceramic and silicon carbide fibers. The only difference in the process and apparatus described hereinabove for use with non-sized fibers is that breaker bars 17, 17' may be removed. Accordingly, the term "filaments" as used in the following claims is intended to include carbon, ceramic, silicon carbide and aramid fibers, as well as, glass filaments. It will also be understood that, for certain applications, the redirect rollers may be used without the spray means for producing the high velocity curtain of slurry. Similarly, the spray means for producing the high velocity curtain of slurry may be used without the redirect rollers. However, in the best mode of practicing the present invention, both the redirect rollers and the spray means cooperate to produce a prepreg tape having the optimum properties which results from having a minimum of broken filaments, a maximum strength matrix bond of filaments and resin, and a maximum of transverse tensile strength.

Having described the preferred embodiment and best mode of the invention, it will be understood that the foregoing description is purely illustrative of the principles of the invention, and that the invention is not to be limited other than as expressly set forth in the following claims.

That which is claimed is:

1. In a method of producing prepreg material, the improvement comprising:
   (a) passing a plurality of filaments through a slurry bath containing a thermoplastic resin to be impregnated into and coated on the filaments, and
   (b) while in said slurry bath, contacting said plurality of filaments with at leas one high velocity curtain of said slurry.

2. The method as claimed in claim 1 further including the step of:
   (b) passing said plurality of filaments around a plurality of redirect rollers, said redirect rollers being journaled for rotation in the same direction as the direction of said plurality of filaments.

3. The method as claimed in claim 1 wherein said thermoplastic resin comprises powdered poly(arylene sulfide).

4. The method as claimed in claim 1 wherein said thermoplastic resin comprises powdered polyphenylene sulfide.

5. The method as claimed in claim 1 wherein said multiplicity of filaments are selected from the group of filaments comprising glass, ceramic, silicon carbide and carbon filaments.

6. The method as claimed in claim 2 wherein said thermoplastic resin comprises powdered poly(arylene sulfide).

7. The method as claimed in claim 2 wherein said thermoplastic resin comprises polyphenylene sulfide.

8. The method as claimed in claim 3 wherein said multiplicity of filaments are selected from the group of filaments comprising glass, ceramic, silicon carbide and carbon filaments.

9. Apparatus for producing prepreg material from a plurality of filaments comprising:
   (a) bath means for containing a slurry of powdered thermoplastic resin suspended in a liquid medium, and
   (b) curtain spray means located in said bath means for forcefully contacting said plurality of filaments with at least one high velocity curtain of said slurry.

10. The apparatus as claimed in claim 9 wherein said spray means comprise at least one spray header extending across the direction of movement of said plurality of filaments.

11. The apparatus as claimed in claim 10 wherein said spray header includes a slot through which said high velocity curtain of said slurry is forcefully discharged into contact with said plurality of filaments.

12. The apparatus as claimed in claim 11 wherein the width of said slot is in the range of 1/16 of ¼ of an inch.

13. Apparatus for producing prepreg material from a plurality of filaments comprising:
   (a) bath means for containing a slurry of powdered thermoplastic resin suspended in a liquid medium,
   (b) a plurality of redirecting roller means mounted for rotation in said both means for guiding said plurality of filaments through said bath means, and
   (c) curtain spray means located in said bath means for producing a high velocity curtain of slurry against said plurality of filaments.

* * * * *